United States Patent
Lee (10) Patent No.: US 8,462,731 B2
(45) Date of Patent: Jun. 11, 2013

(54) NEIGHBOR CELL MONITORING METHOD AND APPARATUS FOR DUAL-STANDBY MOBILE TERMINAL

(75) Inventor: Kwon Yee Lee, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 771 days.

(21) Appl. No.: 12/621,593

(22) Filed: Nov. 19, 2009

(65) Prior Publication Data

US 2010/0124929 A1    May 20, 2010

(30) Foreign Application Priority Data

Nov. 19, 2008   (KR) .................. 10-2008-0114992

(51) Int. Cl.
*H04W 4/00*   (2009.01)
(52) U.S. Cl.
USPC ............ 370/331; 370/332; 370/329; 370/334
(58) Field of Classification Search
None
See application file for complete search history.

(56) References Cited

U.S. PATENT DOCUMENTS

| | | | |
|---|---|---|---|
| 2004/0160929 A1* | 8/2004 | Shpak | 370/338 |
| 2004/0266435 A1* | 12/2004 | de Jong et al. | 455/436 |
| 2005/0037758 A1* | 2/2005 | Rimoni | 455/436 |
| 2008/0108353 A1* | 5/2008 | Lee et al. | 455/437 |

\* cited by examiner

*Primary Examiner* — Robert Scheibel
*Assistant Examiner* — Anez Ebrahim
(74) *Attorney, Agent, or Firm* — Cha & Reiter, LLC (57) ABSTRACT

A neighbor cell monitoring method and apparatus for a dual-standby mobile terminal is provided to reduce unnecessary power consumption by controlling one of two communication units to operate in an idle state while the other performs neighbor cell monitoring. A neighbor cell monitoring method for multi-standby mobile terminal includes acquiring a neighbor's cell information through neighbor cell monitoring by operation of a master unit; performing cell tracking by the master unit and a slave unit independently; executing, when a cell change event is detected by the master unit, the cell change event using the neighbor cell information by the master unit; and transmitting, when a cell change event is detected by the slave unit, from the neighbor cell information from the master unit to the slave unit and executing the cell change event using the neighbor cell information by the slave unit.

16 Claims, 3 Drawing Sheets

NEIGHBOR CELL MONITORING METHOD AND APPARATUS FOR DUAL-STANDBY MOBILE TERMINAL

CLAIM OF PRIORITY

This application claims priority from an application entitled "NEIGHBOR CELL MONITORING METHOD AND APPARATUS FOR DUAL-STANDBY MOBILE TERMINAL" filed in the Korean Intellectual Property Office on Nov. 19, 2008 and assigned Serial No. 10-2008-0114992, the contents of which are incorporated herein by reference in its entirety.

BACKGROUND OF THE INVENTION

1. Field of the Invention

The present invention relates to a dual-standby mobile terminal. More particularly, the present invention relates to a neighbor cell monitoring method and apparatus for a dual-standby mobile terminal that is capable of reducing unnecessary power consumption.

2. Description of the Related Art

Recently, multi-standby mobile terminals, which allow a subscriber to receive calls through different communication networks with multiple Subscriber Identity Modules (SIMs), are emerging in the market. As a representative multi standby mobile terminal, a dual-standby GSM (Global System for Mobile telecommunication) mobile terminal is well-known.

The dual-standby GSM mobile terminal (hereinafter, called just 'mobile terminal') is implemented with two sets of function modules operating on two different GSM frequency bands. That is, the dual-standby mobile terminal includes a pair and core modules, a pair of power management module, a pair of memory modules, a pair of Radio Frequency (RF) modules, and a pair of SIM, and these paired function modules constituting two individual GSM communication units.

The two GSM units can be configured to operate with common functional units including, for example a display unit, a keypad, a battery, and the like. Also, the two GSM units can communicate through an interface such as a Dual Port Random Access Memory (DPRAM) interface. The two GSM units can operate as individual mobile terminals: one as the master GSM unit and the other as the slave GSM unit. Since the master and slave GSM units operate individually, the two units also perform main cell tracking and neighbor cell monitoring simultaneously. Such overlapped actions are continued in most operational processes including cell selection, cell reselection, and handover, as well as in the initial power-on of the dual-standby GSM mobile terminal.

Meanwhile, a mobile terminal acquires neighbor cell information from the cell on which the mobile terminal has camped. In case that the dual standby GSM mobile terminal has camped on a specific cell, the master and slave GSM units simultaneously receive the same neighbor cell information provided by the cell.

More particularly, the master and slave GSM units of the dual-standby GSM mobile terminal receive the same neighbor cell list from the same cell, and this means information redundancy. From the viewpoint of the mobile terminal, the overlapped operations of the master and slave GSM units to acquire the same neighbor cell list causes unnecessary resource and power waste.

As mentioned above, the conventional dual-standby mobile terminal is configured such that the master and slave units perform neighbor cell monitoring simultaneously to acquire the same neighbor cell list.

Such overlapped operations of the master and slave units of a mobile terminal increase the RF processing load and power consumption, resulting in unnecessary resource and energy waste by the duplicated operation.

SUMMARY OF THE INVENTION

The present invention provides an efficient neighbor cell monitoring method and apparatus for a dual-standby mobile terminal.

Also, the present invention provides a neighbor cell monitoring method for a dual-standby mobile terminal that reduces resource waste caused by overlapped neighbor cell monitoring operations of the master and slave communication units of the dual standby mobile terminal.

Furthermore, the present invention provides a neighbor cell monitoring method for a dual-standby mobile terminal that reduces power consumption by performing the neighbor cell monitoring operation with one of the master and slave communication units of the dual standby mobile terminal while switching off the cell monitoring operation of the other, resulting in long battery life.

In accordance with an exemplary embodiment of the present invention, a neighbor cell monitoring method for multi-standby mobile terminal includes acquiring a neighbor cell information by a master communication unit performing neighbor cell monitoring; performing cell tracking by both the master communication unit and a slave communication unit independently of each other; detecting a cell change event by the master communication unit, and executing the cell change event by using the neighbor cell information acquired by the master communication unit; and detecting the cell change event by the slave communication unit, and transmitting the neighbor cell information from the master communication unit to the slave communication unit, and executing the cell change event using the neighbor cell information transmitted to the slave communication unit.

In accordance with another exemplary embodiment of the present invention, a neighbor cell monitoring method for a multi-standby mobile terminal includes camping on a cell according to a cell change event detected by one of a master communication unit and a slave communication unit; updating a neighbor cell list based on a neighbor cell information acquired through neighbor cell monitoring performed by the master communication unit; performing cell tracking by means of the master communication unit and the slave communication unit independently; determining, when a cell change event is detected, whether the cell change event is detected by the master communication unit or the slave communication unit; transferring, when the cell change event is detected by the slave communication unit, the neighbor cell list from the master communication unit to the slave communication unit; and selecting a cell to which the cell change event is executed based on the neighbor cell list; and camping on the selected cell by the slave communication unit.

In accordance with another exemplary embodiment of the present invention, a dual standby mobile terminal having a master communication unit and a slave communication unit includes a master controller for acquiring neighbor cell information through neighbor cell monitoring, for executing a cell change event based on the neighbor cell information by operation of the master communication unit, when a cell change event is detected by the master communication unit, and for transferring, when the cell change event is detected by the slave communication unit, the neighbor cell information to the slave communication unit; and a slave controller for reporting, when the cell change event is detected by the slave communication unit, detection of the cell change event to the master controller and for executing the cell change event based on the neighbor cell event by operation of the slave communication unit.

BRIEF DESCRIPTION OF THE DRAWINGS

The above and other exemplary objects, features and advantages of the present invention will become more apparent from the following detailed description in conjunction with the accompanying drawings, in which.

DETAILED DESCRIPTION

Exemplary embodiments of the present invention are described with reference to the accompanying drawings. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

The present invention relates to a multi-standby mobile terminal. In the following description, a neighbor cell monitoring method and apparatus is directed to a dual mode GSM mobile terminal as a representative multi standby mobile terminal. The terms "dual-standby mobile terminal" and "dual-standby GSM mobile terminal" are synonymously used throughout the following description.

In an exemplary embodiment of the present invention, an efficient neighbor cell monitoring method for a dual-standby mobile is proposed. The neighbor cell monitoring method enables the dual-standby mobile terminal to perform the neighbor cell monitoring operation by means of one of the master and slave mobile communication units so as to reduce unnecessarily overlapped operations. Unlike the conventional dual-standby mobile terminal in which both the master and slave mobile communication units perform the neighbor cell monitoring, the dual-standby mobile terminal operating with the neighbor cell monitoring method according to an exemplary embodiment performs the neighbor cell monitoring by the master communication unit while switching off the neighbor cell monitoring operation of the slave communication unit, resulting in reduction of unnecessary energy waste. The switch-on time of a RF chip which is a main energy consuming component is reduced to minimize the energy consumption.

In an exemplary embodiment of the present invention, the dual-standby mobile terminal performs neighbor cell monitoring by the master communication unit while the slave communication unit switches off its neighbor cell monitoring operation, thereby negating unnecessary RF operations and thus reducing battery power consumption.

The neighbor cell monitoring method for a dual-standby mobile terminal will now described in more detail with reference to FIGS. 1 to 3. First, the operation of the dual-standby mobile terminal to acquire and update neighbor cell information will be described with reference to FIG. 1.

Figure 1:
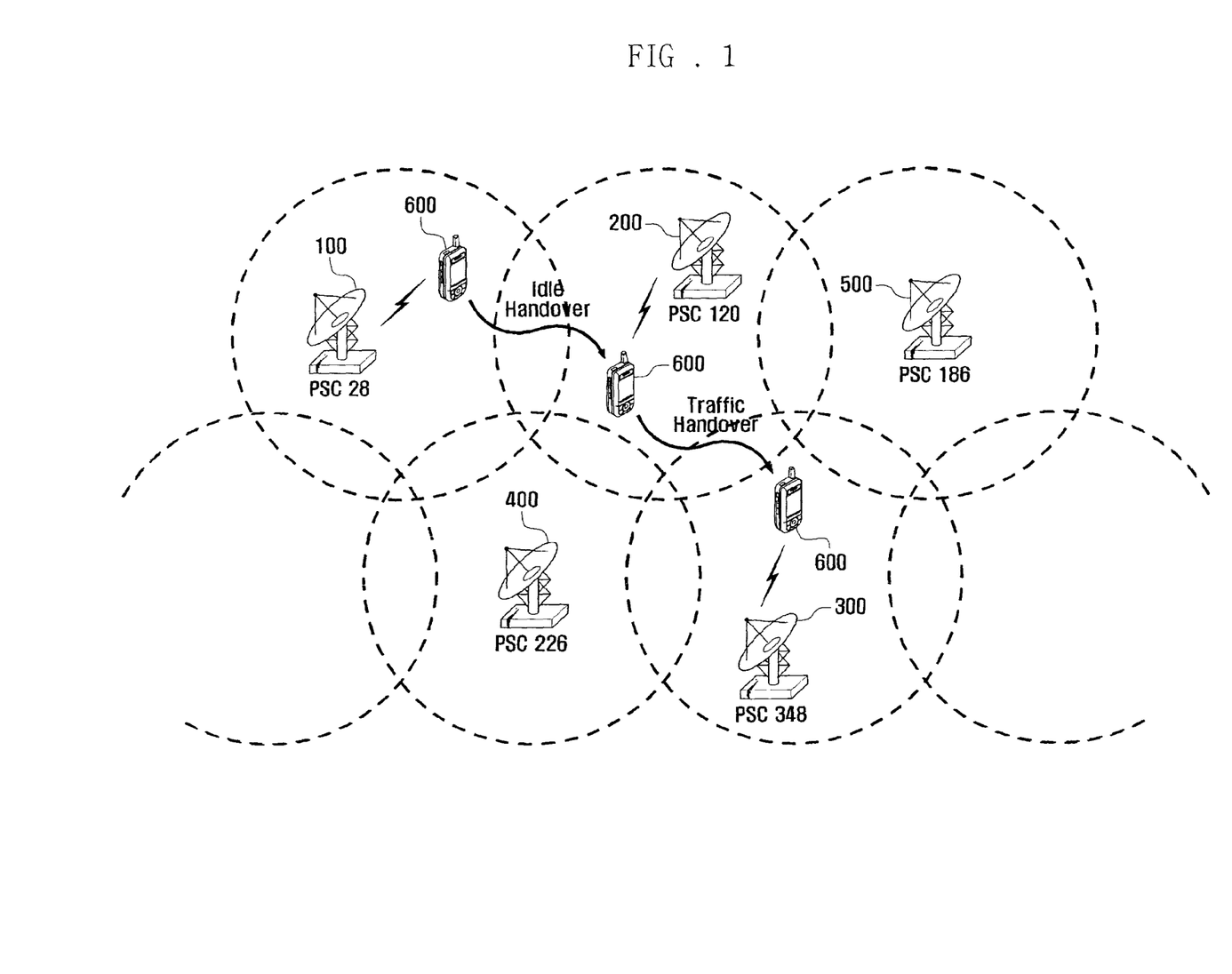
FIG. 1 is a schematic diagram illustrating a mobile communication system in which a dual-standby mobile terminal is performing neighbor cell monitoring according to an exemplary embodiment of the present invention.

FIG. 1 is a schematic diagram illustrating a mobile communication system in which a dual-standby mobile terminal is performing neighbor cell monitoring according to an exemplary embodiment of the present invention.

In order to help understand the neighbor cell monitoring method of the present invention, how the main cell (i.e. serving cell) provides a mobile terminal with the information about the adjacent cells, i.e. the neighbor cell information, will now be described.

In the mobile communication system such as GSM system, the main cell manages the neighbor cells to which a handover may occur in the form of a neighbor cell list. The main cell registers the Primary Scrambling codes (PSCs) of a predetermined number of neighbor cells with its neighbor cell list and provides the neighbor cell list as neighbor cell information to the mobile terminal.

The neighbor cell information is broadcast through the System Information Block 2 (SIB2) of the Broadcast Channel (BCH) periodically such that the mobile terminals operating in idle mode within the coverage of the cell receive the neighbor cell information. In case that a mobile terminal operating in active mode hands over to a new cell, the new serving cell first provides the mobile terminal with the neighbor cell information through a measurement control message on a Dedicated Channel (DCH) such that the mobile terminal updates the neighbor cell information.

A dynamic neighbor cell information management procedure is now described hereinafter with reference to FIG. 1.

In FIG. 1, the dual-standby mobile terminal 600 moves from a first cell 100 to a third cell 300 by passing through the second cell 200. The first cell 100 is identified by the primary scrambling code (PSC) 28, the second cell 200 by PSC 120, the third cell 300 by PSC 348, the fourth cell 400 by PSC 226, and the fifth cell 500 by PSC 186.

When the dual-standby mobile terminal 600 is positioned within the first cell 100, the first cell 100 broadcasts the neighbor cell information containing the PSCs of its neighbor cells through the System Information Block 2 (SIB2) of the Broadcast Channel (BCH) such that the mobile terminal 600 receives the neighbor cell information. For instance, the first cell 100 can broadcast the neighbor cell information containing the PSC 120 of the second neighbor cell 200 and the PSC 226 of the fourth neighbor cell 400 through the SIB2. Accordingly, the dual-standby mobile terminal 600 acquires the neighbor cell list containing the PSCs of the second cell 200 and the fourth cell 400 that are adjacent to the first cell 100.

Next, the dual-standby mobile terminal 600 hands over from the first cell 100 to the second cell 200. At this time, the dual-standby mobile terminal 600 receives the neighbor cell information broadcast by the second cell 200 through the BCH SIB2. In FIG. 1, it is assumed that the handover from the first cell 100 to the second cell 200 is an idle mode handover occurring when a mobile terminal operating in idle mode moves across a cell boundary. The neighbor cell information broadcast by the second cell 200 contains the PSC 28 of the first cell 100, PSC 348 of the third cell 300, PSC 226 of the fourth cell 400, and PSC 186 of the fifth cell 100. The dual standby mobile terminal 600 receives the neighbor cell information and updates its neighbor cell list to include the first cell 100, third cell 300, fourth cell 400, and fifth cell 500. In FIG. 1, it is assumed that the dual-standby mobile terminal 600 enters an active mode within the second cell 200.

Next, the dual-standby mobile terminal 600 hands over from the second cell 200 to the third cell 300. Upon completion of the handover from the second cell 200 to the third cell 300, the third cell 300 transmits a measurement control message containing the neighbor cell information to the dual standby mobile terminal 600 such that the dual standby mobile terminal 600 updates the neighbor cell list with the PSCs contained in the neighbor cell information. At this time, the handover from the second cell 200 to the third cell 300 is an active mode handover occurring when a mobile terminal operating in active mode moves across a cell boundary. The third cell 300 transmits the neighbor cell information containing the PSCs of its neighbor cells, i.e. the PSC 120 of the second cell, the PSC 226 of the fourth cell 400, and the PSC 186 of the fifth cell 500, through the measurement control message at the time when the handover is completed. The dual-standby mobile terminal 600 receives the neighbor cell information and updates the neighbor cell list with PSCs of the second cell 200, fourth cell 400, and fifth cell 500.

As discussed herein above, the dual-standby mobile terminal 600 receives the neighbor cell list from the main cell and manages the information on the neighbor cells (neighbor cell information) dynamically based on the neighbor cell list. The dual-standby mobile terminal 600 performs the handover threshold level test to the PSCs registered with the neighbor cell list, thereby facilitating the handover determination.

The neighbor cell information acquisition is commenced when the dual-standby mobile terminal 600 enters and camps on a specific cell following the detection of a cell change event. The cell change event can be any of a cell selection, a cell reselection, and a handover event.

In the conventional dual-mode mobile terminal, both the master and slave communication units are performing the neighbor cell monitoring operations to acquire the neighbor cell information. This means that, in the exemplary situation of FIG. 1, the cell list acquired by the master communication unit and the cell list acquired by the slave communication unit are identical with each other. Such redundant processing operations of the master and slave communication units will cause unnecessary battery power consumption.

In an exemplary embodiment of the present invention, a neighbor cell monitoring method for a dual-standby mobile terminal that reduces the redundant processing operations by negating the neighbor cell monitoring operation of the slave communication unit. That is, the dual-mode mobile terminal according to an exemplary embodiment of the present invention performs the neighbor cell monitoring-related operations via the master communication unit while maintaining the slave communication unit in idle state. In an exemplary embodiment of the present invention, the neighbor cell information acquired by the master communication unit is shared by the slave communication unit such that, when a cell change event is detected by the slave communication unit, the slave communication unit can process the follow-up operations using the neighbor cell information acquired by the master communication unit.

The structure and functions of the dual-standby mobile terminal to achieve the objects of the present invention are described hereinafter with reference to FIGS. 2 and 3. However, the present invention is not limited to the following description but can be implemented with various modifications.

Figure 2:
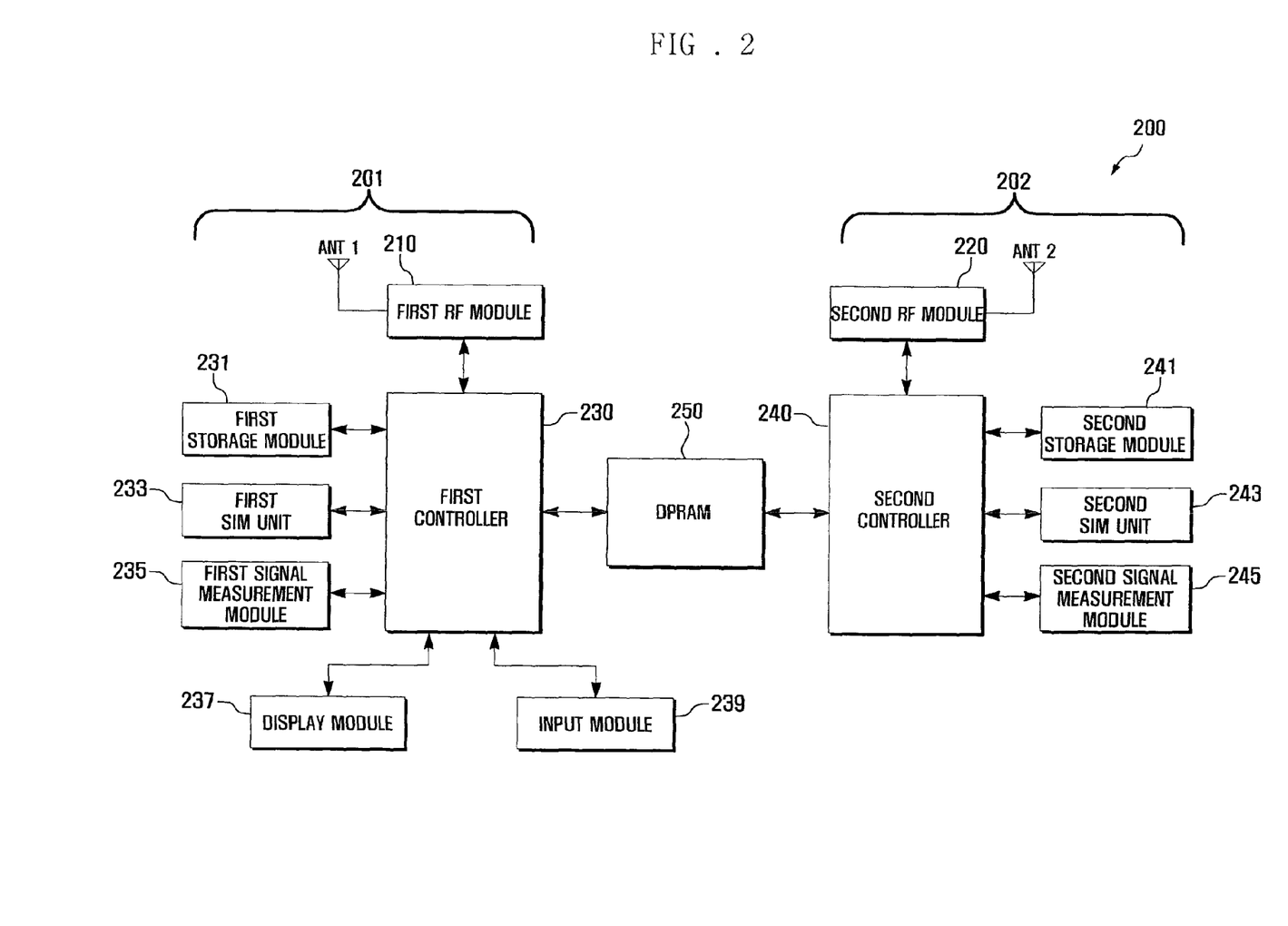
FIG. 2 is a block diagram illustrating a configuration of a dual-standby mobile terminal according to an exemplary embodiment of the present invention.

FIG. 2 is a block diagram illustrating a configuration of a dual-standby mobile terminal according to an exemplary embodiment of the present invention. Although the following description is directed to the dual-standby mobile terminal supporting dual frequency bands, the present invention is not limited thereto. For instance, the neighbor cell monitoring method of the present invention can be applied to any of the mobile terminals that can stand by on more than one frequency bands.

Referring now to FIG. 2, the dual-standby mobile terminal includes two GSM units operating on two different GSM frequency bands. The first GSM unit is a master communication unit 201 and the second GSM unit 202 is a slave communication unit. The first GSM unit 201 preferably includes, for example, a first Radio Frequency (RF) module 210, a first controller 230, a first storage module 231, a first Subscriber Identity Module (SIM) unit 233, a first signal measurement module 235, a display module 237, and an input module 239. The second GSM unit 202 includes a second RF module 220, a second controller 240, a second storage module 241, a second SIM unit 243, and a second signal measurement module 245. The first and second GSM units are connected via a DPRAM 250 which supports Inter Process Communication.

Still referring to FIG. 2, the first and second RF modules 210 and 220 are responsible for establishing a communication link according to the corresponding communication protocols. Each of the first and second RF modules 210 and 220 includes an RF transmitter for up-converting and amplifying the transmission signal and an RF receiver for low noise amplifying and down-converting the received signal. The first and second RF modules, 210 and 220 are coupled to the respective antennas (ANT1 and ANT2) and duplexers for separating the transmission and reception.

Each of the first and second controllers, 230 and 240, includes a data processing module having a modem and a codec. The codec can include, for example, a data codec for processing packet data and an audio codec for processing audio signals, including voice. The first and second controllers, 230 and 240 encode and modulate the transmission signals and demodulate and decode the received signals via the data processing modules. The data processing modules of the first and second controllers can also be implemented as individual function blocks separated from the first and second controllers 230 and 240.

More particularly, in an exemplary embodiment of the present invention, the first controller 230 assigns numbers of channels for the first and second GSM units (master and slave GSM units) to manage, controls received signal strength measurement for the assigned channels, aggregates the received signal strengths measured by the first and second GSM units, and sorts the channels in order of strength. The second controller 240 controls the second GSM unit to measure received signal strengths of the channels assigned by the first controller 230.

One of the first and second controllers 230 and 240 can be configured as a master controller for controlling an entirety of function blocks of the dual-standby mobile terminal. In the example of FIG. 2, the first controller 230 is configured as the master controller.

The DPRAM 205 acts as a communication interface between the first and second controllers 230 and 240. The first and second SIM units 233, 243, are provided with respective connection interfaces to establish electrical connections with SIM cards that store the subscriber information and authentication information for the respective GSM networks. The SIM cards can be attached and detached to/from the dual-standby mobile terminal via the first and second SIM units 233 and 243.

Still referring to FIG. 2, the first and second signal measurement modules 235 and 245 measure the received signal strengths of the channels assigned by the first controller 230 and sort the channels in order of the measurements of the received signal strengths. Although depicted as individual components in FIG. 2, the first and second signal measurement modules 235 and 245 can be integrated into the first and second controller 230 and 240, respectively. In this case, the first and second signal measurement modules 235 and 245 can be omitted in FIG. 2. In addition, a person of ordinary skill in the art understands and appreciates that the grouping of the functional blocks depicted in FIG. 2 can take up a variety of different functional combinations that are within the spirit and scope of the invention. As shown in FIG. 2, the dual-standby mobile terminal according to an exemplary embodiment of the present invention includes the first storage module 231, display module 237, and input module 239 operating under the control of the first controller 230, and the second storage module 241 operating under the control of the second controller 240.

The display module 237 receives the video data provided by the first and second controllers 230 and 240 and outputs the video data in a predetermined video format. The display module 237 is configured to display information related to the settings of functions and operation status information such as call-processing status, incoming and outgoing call progress, phonebook data, and incoming call alert. The display module 237 can also display the information related to the manipulations and operations of the dual-standby mobile terminal and application execution progress and result. The display module 237 can be implemented with one of various types of display, including but in no way limited to Liquid Crystal Display (LCD) panels and Organic Light Emitting Diodes (OLED) panels.

The input module 239 generates signals corresponding to the keys input by the user. The input module can be implemented, for example, with at least one of a keypad, a touch-screen, and a touchpad.

The first and second storage modules 231 and 241 operate and store application programs running in the dual-standby mobile terminal under controls of the first and second controllers 230 and 240.

Although not depicted in FIG. 2, the dual-standby mobile terminal further includes at least one of a camera module, a broadcast receiver module, a short range radio communication module such as, for example, a Bluetooth module, a data connection port to connect an external device for data exchange, a charging port, a power supply module, a Power Management Unit (PMU), an audio playback module such as MP3 player, an audio processing module for processing audio signals including voice.

As described above, the dual-standby mobile terminal according to an exemplary embodiment of the present invention includes a master communication unit which controls entire operations of the mobile terminal and master communication unit-specific operations including call processing operations and cell tracking and neighbor cell monitoring operations, and a slave communication unit which controls the slave communication unit-specific operations including call processing operation and cell tracking operation.

In an exemplary embodiment of the present invention, the master communication unit performs the neighbor cell monitoring operation while the slave communication unit performs the cell tracking to the main cell on which the dual-standby mobile terminal camps without overlapped neighbor cell monitoring operation of the slave communication unit.

In another exemplary embodiment of the present invention, when the master communication unit is required to perform a processing operation triggered by a cell change event, the master communication unit performs the processing operation based on the neighbor cell information acquired in neighbor cell monitoring process of the master communication unit to camp on the cell; and when the slave communication unit is required to perform a processing operation triggered by a cell change event, the slave communication unit makes a request to the master communication unit for the neighbor cell information and performs the processing operation to camp on the cell based on the neighbor cell information provided by the master communication unit. The neighbor cell monitoring method of the above described dual-standby mobile terminal will now be described with reference to FIG. 3.

Figure 3:
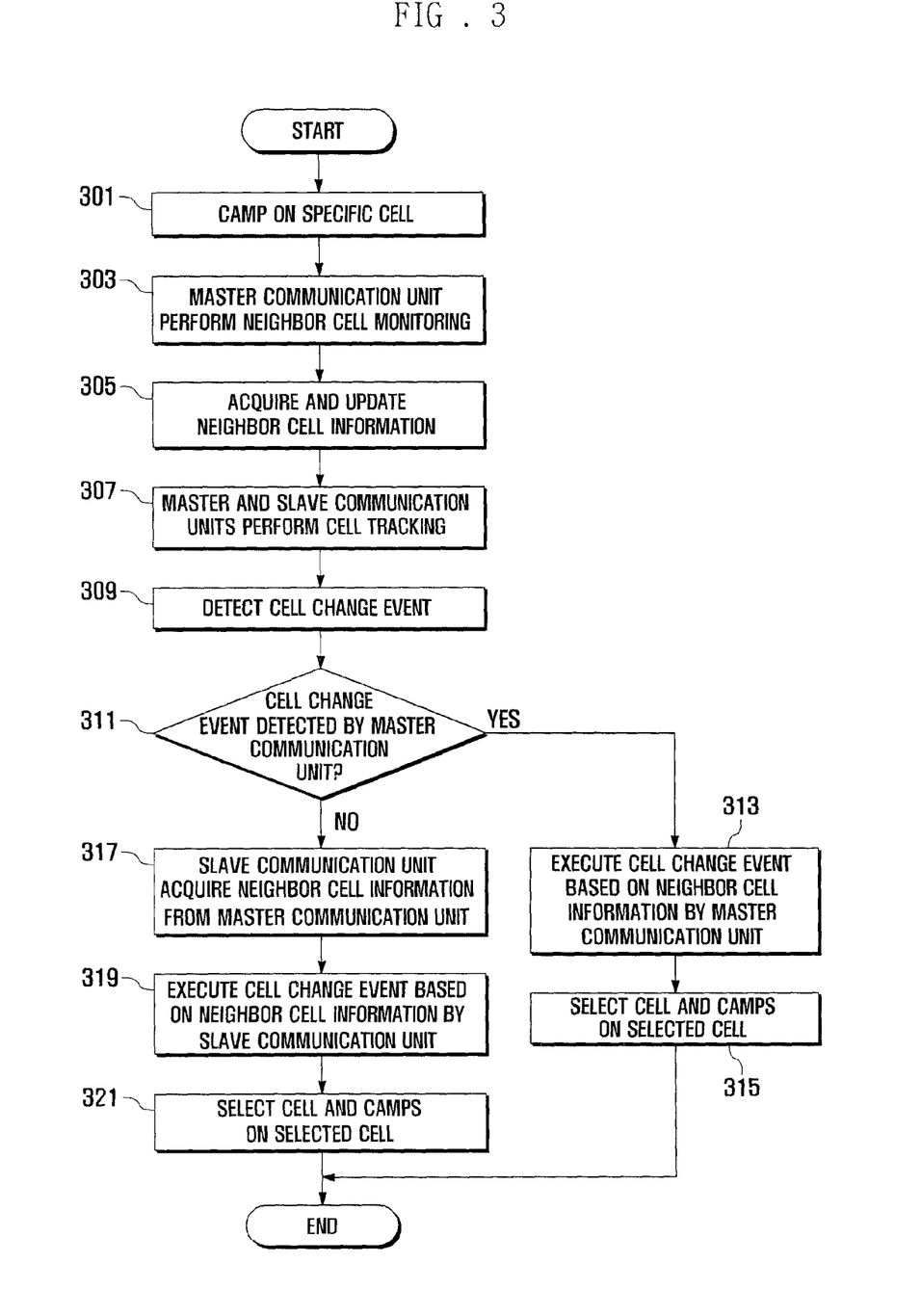
FIG. 3 is a flowchart illustrating a neighbor cell monitoring method for a dual-standby mobile terminal according to an exemplary embodiment of the present invention.

FIG. 3 is a flowchart illustrating exemplary operational steps of a neighbor cell monitoring method for a dual-standby mobile terminal according to an exemplary embodiment of the present invention. In FIG. 3, the neighbor cell monitoring is depicted in relation of the operations of the master and slave communication units of the dual standby mobile terminal.

Referring now to FIG. 3, the dual-standby mobile terminal enters a specific cell and camps on the cell according to a cell change event detected by one of the master and slave communication units (S301). The cell change even can be any of a cell selection event, a cell reselection event, and a handover event.

After camping on the cell, the dual-standby mobile terminal performs neighbor cell monitoring via the master communication unit (S303) and acquires the neighbor cell information through the neighbor cell monitoring process (S305). That is, the slave communication unit is in an idle state while the master communication unit of the dual-standby mobile terminal performs the neighbor cell monitoring.

In short, the dual-standby mobile terminal camps on a cell according to the cell change event (S301), performs neighbor cell monitoring via the master communication unit (S303), and acquires the neighbor cell information broadcast by the camped-on cell and updates its neighbor cell information with the acquired neighbor cell information (S305).

After updating the neighbor cell information, the dual-standby mobile terminal performs cell tracking on the serving cell (main cell) via the master and slave communication units according to the predetermined periodicities (S307).

Next, the dual standby mobile terminal detects a cell change event by means of one of the master and slave communication units (309). If a cell change event is detected, the dual standby mobile terminal determines whether the cell change event detected by the master communication unit or the slave communication unit (311). At this time, the master controller (the first controller in FIG. 2) of the master communication unit determines which communication unit detects the cell change event. In case that the cell change event is detected by the slave communication unit, the slave controller (the second control in FIG. 2) of the slave communication unit can notify the master controller of the detection of the cell change event.

If it is determined that the cell change event is detected by the master communication unit at step 311, the dual-standby mobile terminal performs processing operation triggered by the cell change event via the master communication unit based on the neighbor cell information acquired in the neighbor cell monitoring process (313). As a consequence, the dual-standby mobile terminal selects a cell and camps on the selected cell the master communication unit (315). It is noted that steps 313 and 315 are performed by the master communication unit.

Otherwise, still referring to FIG. 3, if it is determined that the cell change event is detected by the slave communication unit at step 311, the dual-standby mobile terminal requests the master communication unit for the neighbor cell information and receives the neighbor cell information from the master communication unit (317). For instance, if the slave controller requests the master controller to send the neighbor cell information, the master controller sends the neighbor cell information acquired in the neighbor cell monitoring process to the slave controller via the DPRAM 250 (shown in FIG. 2). The slave controller can store the neighbor cell information received from the master controller in the storage module of the slave communication unit.

With continued reference to the flowchart in FIG. 3, the dual-standby mobile terminal performs processing operation triggered by the cell change event by means of the slave communication unit based on the neighbor cell information received from the master communication unit (319). As a consequence, the dual-standby mobile terminal selects a cell and camps on the selected cell by operation of the slave communication unit (321). It is noted that in this example, steps 317, 319, and 321 are performed by the slave communication unit.

As described herein above, the neighbor cell monitoring method and apparatus for a dual-standby mobile terminal according to the present invention enables only a master communication mode to perform the neighbor cell monitoring while a slave communication unit is in an idle state, thereby avoiding unnecessarily overlapped processing operations. Since the slave communication unit is in an idle mode while the master communication unit performs the neighbor cell monitoring, the total power-on time of the RF chips that are main energy consuming components is significantly reduced, thereby reducing unnecessary power consumption and thus increasing battery life.

Also, the neighbor cell monitoring method and apparatus for a dual-standby mobile terminal according to the present invention minimizes the unnecessarily overlapped processing operations performed by two communication units of the dual-standby mobile terminal, so as to reduce the total active time of the RF chips of two communication units, thereby reducing the processing load and energy consumption of the dual-standby mobile terminal, resulting in longer battery life and improvement of user satisfaction and utilization.

Although exemplary embodiments of the present invention have been described in detail herein above, it should be clearly understood that many variations and/or modifications of the basic inventive concepts herein taught which may appear to those skilled in the present art will still fall within the spirit of the present invention and the scope of the appended claims.

What is claimed is:

1. A neighbor cell monitoring method for a multi-standby mobile terminal, comprising:
   acquiring a neighbor cell information by a master communication unit Performing neighbor cell monitoring;
   performing cell tracking of neighboring cells of a main cell by both the master communication unit and a slave communication unit independently of each other;
   detecting a cell change event by the master communication unit, and executing the cell change event by using the neighbor cell information acquired by the master communication unit; and
   detecting the cell change event by the slave communication unit, and transmitting the neighbor cell information from the master communication unit to the slave communication unit, and executing the cell change event using the neighbor cell information transmitted to the slave communication unit,
   wherein the master communication unit performs the neighbor cell monitoring operation while the slave communication unit performs cell tracking to the main cell on which the dual standby mode terminal camps without overlapped neighbor cell monitoring operation of the slave communication unit.

2. The neighbor cell monitoring method of claim 1, wherein executing the cell change event by the master communication unit by using the neighbor cell information acquired by the master communication unit occurs while maintaining the slave communication unit in an idle state.

3. The neighbor cell monitoring method of claim 1, wherein the cell change event comprises any of a cell selection event, a cell reselection event, and a handover event.

4. The neighbor cell monitoring method of claim 1, wherein executing the cell change event by either of the master communication unit or the slave communication unit event comprises:
   determining a cell to attach on based on the neighbor cell information; and
   camping on the determined cell.

5. A neighbor cell monitoring method for a multi-standby mobile terminal, comprising:
   camping on a cell according to a cell change event detected by one of a master communication unit and a slave communication unit;
   updating a neighbor cell list based on a neighbor cell information acquired through neighbor cell monitoring performed by the master communication unit;
   performing cell tracking performing cell tracking of neighboring cells of main cell by both the master communication unit and the slave communication unit independently of each other without overlapped neighbor cell monitoring operation by the slave communication unit;
   determining, when the cell change event is detected, whether the cell change event is detected by the master communication unit or the slave communication unit;
   transferring, when the cell change event is detected by the slave communication unit, the neighbor cell list from the master communication unit to the slave communication unit; and
   selecting a cell to which the cell change event is executed based on the neighbor cell list; and
   camping on the selected cell by operation of the slave communication unit.

6. The neighbor cell monitoring method of claim 5, further comprising maintaining the slave communication unit in an idle state while the master communication unit performs the neighbor cell monitoring.

7. The neighbor cell monitoring method of claim 5, further comprising when the cell change event is detected by the slave communication unit, reporting the detection of the cell change event by a slave controller of the slave communication unit to a master controller of the master communication unit.

8. The neighbor cell monitoring method of claim 5, further comprising:
   selecting a cell to which the cell change event is executed based on the neighbor cell list, when the cell change event is detected by the master communication unit; and
   camping on the selected cell by operation of the master communication unit.

9. The neighbor cell monitoring method of claim 5, wherein transferring the neighbor cell list comprises:
   requesting, at a slave controller of the slave communication unit, a master controller of the master communication unit for the neighbor cell list;
   sending, at the master controller, the neighbor cell list to the slave controller via a Dual Port Random Access Memory (DPRAM); and
   acquiring, at the slave controller, the neighbor cell list sent via the DPRAM.

10. The neighbor cell monitoring method of claim 5, wherein the cell change event comprises any of a cell selection event, a cell reselection event, and a handover event.

11. The neighbor cell monitoring method of claim 8, wherein the neighbor cell list used by the master and slave communication units for selecting a cell are identical.

12. A dual-standby mobile terminal having a master communication unit and a slave communication unit, comprising:
- a master controller for acquiring neighbor cell information through neighbor cell monitoring, for executing a cell change event based on the neighbor cell information by operation of the master communication unit, when the cell change event is detected by the master communication unit, and for transferring, when the cell change event is detected by the slave communication unit, the neighbor cell information to the slave communication unit without overlapped neighbor cell monitoring operation by the slave communication unit; and
- a slave controller for reporting, when the cell change event is detected by the slave communication unit, detection of the cell change event to the master controller and for executing the cell change event based on a neighbor cell event by operation of the slave communication unit.

13. The dual-standby mobile terminal of claim 12, wherein the slave communication unit is maintained in an idle state while the master communication unit is performing the neighbor cell monitoring.

14. The dual-standby mobile terminal of claim 13, further comprising a Dual Port Random Access Memory (DPRAM) through which the neighbor cell information is transferred from the master controller to the slave controller.

15. The dual-standby mobile terminal of claim 14, wherein a neighbor cell list used by the master and slave communication units for selecting a cell are identical.

16. The dual-standby mobile terminal of claim 12, wherein the cell change event comprises any of a cell selection event, a cell reselection event, and a handover event.

* * * * *

UNITED STATES PATENT AND TRADEMARK OFFICE
CERTIFICATE OF CORRECTION

PATENT NO. : 8,462,731 B2
APPLICATION NO. : 12/621593
DATED : June 11, 2013
INVENTOR(S) : Kwon Yee Lee It is certified that error appears in the above-identified patent and that said Letters Patent is hereby corrected as shown below:

In the Claims:

Column 9, Claim 1, Line 48 should read as follows:
--...unit performing neighbor cell...--

Column 10, Claim 5, Line 24 should read as follows:
--...performing cell tracking of neighboring...--

Column 10, Claim 5, Line 25 should read as follows:
--...cells of a main cell by...--

Signed and Sealed this
Thirteenth Day of August, 2013

Teresa Stanek Rea
*Acting Director of the United States Patent and Trademark Office*